April 10, 1962 — B. R. BOYLE — 3,029,112
COMPOSITE STRUCTURES, PARTICULARLY COMPOSITE PISTONS
Filed Jan. 29, 1960

INVENTOR
BRYAN R. BOYLE

BY
Watson, Cole, Grindle & Watson
ATTORNEYS 3,029,112
COMPOSITE STRUCTURES, PARTICULARLY
COMPOSITE PISTONS
Bryan Robert Boyle, London, England, assignor to D. Napier & Son Limited, London, England, a company of Great Britain
Filed Jan. 29, 1960, Ser. No. 5,424
Claims priority, application Great Britain Feb. 2, 1959
10 Claims. (Cl. 309—14)

This invention relates to composite structures comprising at least two separate contacting portions formed of materials having different co-efficients of thermal expansion. The invention thus is applicable particularly though not exclusively to composite pistons, as used for example in compressors or internal combustion engines where the crown of the piston is manufactured of a high temperature heat resisting material such as steel while the main body of the piston is formed of a material such as an aluminum alloy having relatively low density and preferably high heat conductivity.

It is an object of the invention to provide an improved composite structure of the general kind referred to which will locate the two portions of the structure while allowing relative thermal expansion. Thus in the case of a piston it is important that the crown and body portions should remain accurately aligned on the longitudinal axis of the piston.

According to the present invention therefore a composite structure comprises two separate contacting portions formed of materials having different co-efficients of thermal expansion, the adjacent faces of the two portions having cooperating surfaces generated by lines passing through a central longitudinal axis of the structure, such that the surfaces cooperate to locate the two portions of the structure against relative displacement in directions normal to planes containing the longitudinal axis while allowing relative thermal expansion between the two portions.

Preferably the generating lines pass through a common point on the axis and it is desirable that the cooperating surfaces of the crown and body or other portions should be formed with at least three alternating ridges and grooves radiating from the longitudinal axis.

In a preferred construction the height of the ridges and the depth of the grooves increases progressively at increasing distances from the axis, and conveniently the troughs of the grooves and the peaks of the ridges on each portion lie on imaginary cones, whose apex angles are symmetrical about the longitudinal axis the open angles of the two portions being oppositely directed. This design simplifies the manufacturing operations since the grooves and ridges can be formed from flat topped cylindrical portions by machining or broaching the troughs in a direction inclined to the flat end face of each portion.

In one particular preferred embodiment the height of the ridges above an imaginary plane normal to the longitudinal axis is equal to the depth of the grooves below this plane, at the same radial displacement from the axis.

According to a preferred feature of the invention the structure includes a connection between the two portions of the structure permitting relative expansion between the two portions.

Thus the connecting means may comprise one or more elongated anchorage members extending longitudinally and connected rigidly at their opposite ends to the two portions but being somewhat flexible and free for at least limited transverse movement over their intermediate portions.

To permit sufficient relative displacement between the ends of each anchorage member the anchorage to one portion is preferably closely adjacent to the face thereof in contact with the other portion, while the anchorage to the second portion is at a point remote from the first portion.

The invention also consists particularly in a composite piston for an internal combustion engine comprising crown and body portions forming a composite piston structure as defined above.

The invention may be performed in various different ways but one specific embodiment will now be described by way of example as applied to a composite piston.

Reference will be made to the accompanying drawings in which.

Figure 1:
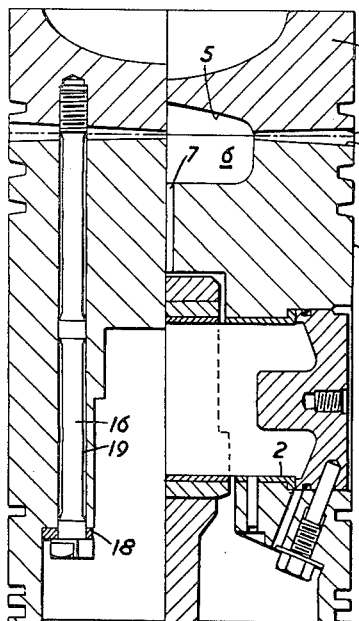
FIGURE 1 is a section partly through a medial plane parallel with the axis of the crank shaft bearing and partly on a parallel plane through one of the fastening bolts.
Figure 2:
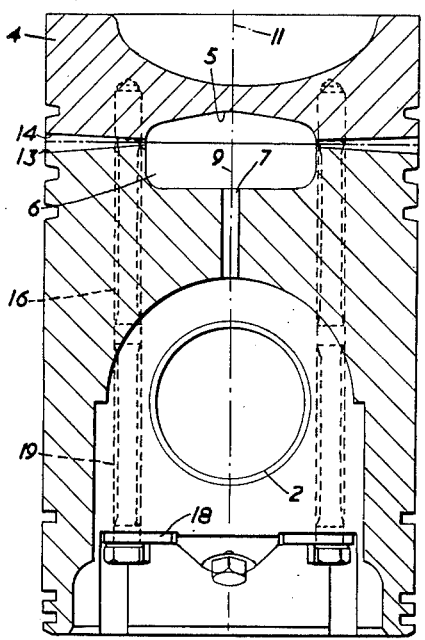
FIGURE 2 is a medial section on a plane perpendicular to the planes of the sections of FIGURE 1.
Figure 3:
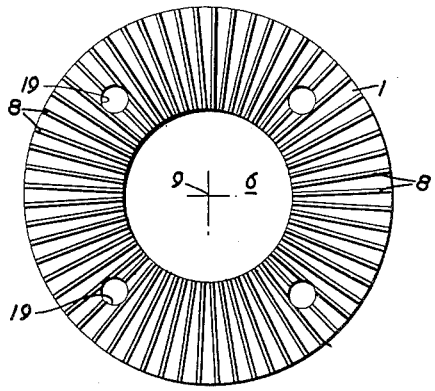
FIGURE 3 is a plane view of the skirt part of the piston.
Figure 4:
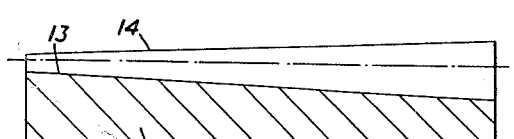
FIGURE 4 is a detailed elevation to an enlarged scale of one of the teeth on the skirt portion.
Figure 5:
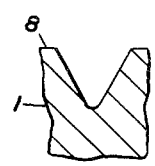
FIGURE 5 is an end section showing the form of this tooth.

In this example the invention is applied to a composite piston for use in a high speed diesel engine. The piston comprises a main body portion 1 formed of a light alloy including the usual gudgeon pin 2 for connection to the small end of the connecting rod, and a crown portion 4 formed of steel, mounted on the upper end of the body portion 1 and having a recess 5 in its lower face which cooperates with a corresponding recess 6 in the upper face of the body portion to form a cavity to which oil is supplied through a supply channel 7 connected to the little end bearing in the body portion.

The cooperating annular faces at the upper end of the body portion 1 and the lower end of the crown portion 4 of the piston are formed with a series of cooperating ridges and grooves 8 radiating from an imaginary point 9 on the longitudinal axis 11 of the piston. The ridges and grooves are all V-sectioned when viewed in a direction looking radially inwards and the height of the ridges and the depth of the grooves increase progressively outwards from the axis 11, the troughs of the grooves and the peaks of the ridges on each portion of the piston lying on imaginary shallow cones 13 and 14 whose apex angles face in opposite directions along the longitudinal axis. Each portion of the piston can thus be machined conveniently from a body having a shallow conical depression in its end face, the rim of this depression being machined out by a series of cuts made by a V-section tool whose direction of movement is inclined to the longitudinal axis at the half cone angle of the depression but in the opposite sense, and radial to the longitudinal axis. The ridge and groove surface of the portion of each piston is thus generated by lines passing through the common point 9 on the central longitudinal axis and in each portion the height of the ridges on one side of an imaginary plane normal to the axis 11 and passing through this common point 9 is equal to or a little less than the depth of the grooves on the other side of this plane, at the same radial displacement from the axis. In a preferred arrangement the half cone angle of the depression referred to is 87°24′, the height of each ridge and the depth of each groove below the imaginary plane through the common point are approximately 0.09″ and 0.101″ respectively at the periphery of the piston, while the apex angle of the V cross-section of the ridges and grooves is approximately 60°. The number of ridges and grooves on each face may vary considerably, but in a preferred design approximately 50 ridges are provided on each face.

The crown and body portions 4 and 1 of the piston are connected to one another by four anchorage bolts 16 arranged symmetrically around the axis and extending substantially the full length of the piston and located rigidly at their upper ends in the crown 4 by screwthreaded drilling 17, and at their lower ends in mountings 18 at the lower end of the body portion. The intermediate length of each of these anchorage bolts 16 lies in an oversize longitudinal bore 19 in the wall of the body portion 1 and the flexibility of each bolt will thus allow small radial displacements between the upper and lower ends thereof resulting from thermal expansion of the crown portion.

What I claim as my invention and desire to secure by Letters Patent is:

1. A composite structure comprising two separate contacting portions formed of materials having different coefficients of thermal expansion, the adjacent faces of the two portions having co-operating surfaces generated by lines passing through a central longitudinal axis of the structure, and the surfaces co-operating to locate the two portions of the structure against relative displacement in directions normal to planes containing the longitudinal axis while allowing relative thermal expansion between the two portions.

2. A composite structure as claimed in claim 1 in which the generating lines pass through a common point on the axis.

3. A composite structure as claimed in claim 2 in which the co-operating surfaces of the two portions are each formed with three alternating ridges and grooves radiating from the longitudinal axis.

4. A composite structure as claimed in claim 3 in which the height of the ridges and the depth of the grooves increase progressively at increasing distances from the axis.

5. A composite structure as claimed in claim 3 in which the troughs of the grooves and the peaks of the ridges on each portion lie on imaginary cones whose apex angles are symmetrical about the longitudinal axis, the apex angles of the two portions being oppositely directed.

6. A composite structure as claimed in claim 3 in which in each portion the height of the ridges on one side of an imaginary plane normal to the longitudinal axis is equal to the depth of the grooves on the other side of this plane at the same radial displacement to the axis.

7. A composite structure as claimed in claim 1 including a connection between the two portions permitting relative expansion between the portions.

8. A composite structure as claimed in claim 7 in which the connection comprises elongated anchorage members extending parallel with the longitudinal axis and connected rigidly at their opposite ends to the two portions but being somewhat flexible and free for at least limited transverse movements over their intermediate parts.

9. A composite structure as claimed in claim 8 in which the anchorage of each anchorage member to one portion is closely adjacent the co-operating faces of the portions while the anchorage to the other portion is relatively remote from the co-operating faces of the portions.

10. A piston as claimed in claim 1 having a crown portion and a body portion constituting the two separate contacting portions.

References Cited in the file of this patent

UNITED STATES PATENTS

| 1,548,329 | Nelson | Aug. 4, 1925 |
| 2,024,058 | Oubridge | Dec. 10, 1935 |